358-69. OR 2,785,221 SR

SEARCH ROOM

T 6532

March 12, 1957 C. P. CARPENTER 2,785,221

COLOR TELEVISION RECEIVER

Filed June 19, 1953 2 Sheets-Sheet 1

Fig. I.

WITNESSES:
E. A. McCloskey.
C. F. Renz

INVENTOR
Chester P. Carpenter.
BY
F. E. Browder
ATTORNEY

March 12, 1957 C. P. CARPENTER 2,785,221

COLOR TELEVISION RECEIVER

Filed June 19, 1953 2 Sheets-Sheet 2

WITNESSES:

E. A. McCloskey.

C. F. Renz

INVENTOR

Chester P. Carpenter.

BY

F. E. Browder

ATTORNEY

United States Patent Office 2,785,221

Patented Mar. 12, 1957

2,785,221

COLOR TELEVISION RECEIVER

Chester P. Carpenter, Pittsburgh, Pa., assignor to Westinghouse Electric Corporation, East Pittsburgh, Pa., a corporation of Pennsylvania Application June 19, 1953, Serial No. 362,904

3 Claims. (Cl. 178—5.4)

This invention relates to color television tubes and more particularly to means for obtaining a sensing signal for improved reproduction of images.

It is an object of this invention to provide an improved color television tube.

According to an arrangement shown and described in U. S. Patent 2,545,325 issued to Paul K. Weimer on March 13, 1951, a color television system is described comprising a cathode ray tube having a viewing screen in the form of repeating series of phosphor strip-like elements. A simultaneous type color television signal is utilized for the transmission of intelligence and a switching arrangement at the receiving end converts the simultaneous type color signal to an elemental sequential type color signal and applies it to the control electrode of the cathode ray tube. The action of the switching arrangement is controlled by a pulse forming arrangement consisting of a photoelectric cell which is responsive to one of the selected component colors. A pulse delay arrangement is employed to control the switch so that the electron gun is gated applying video information to the proper color strip. It is to this general type of color image reproducing arrangements that my invention is directed.

Accordingly, it is another object of my invention to provide an improved means for obtaining a gating pulse to switch video information onto the electron gun of a picture tube at the proper time.

It is another object to provide an improved cathode ray tube and circuit for producing a reliable sensing signal from the viewing screen of the tube in response to a scanning electron beam.

It is another object to provide an improved strip type color picture tube having an improved light responsive device for obtaining a sensing signal that is unaffected by ambient light or the light given off by the selected component color pulse-forming strips.

These and other objects are affected by my invention as will be apparent from the following description taken in accordance with the accompanying drawings throughout which like reference characters indicate like parts, and in which.

Figure 1:
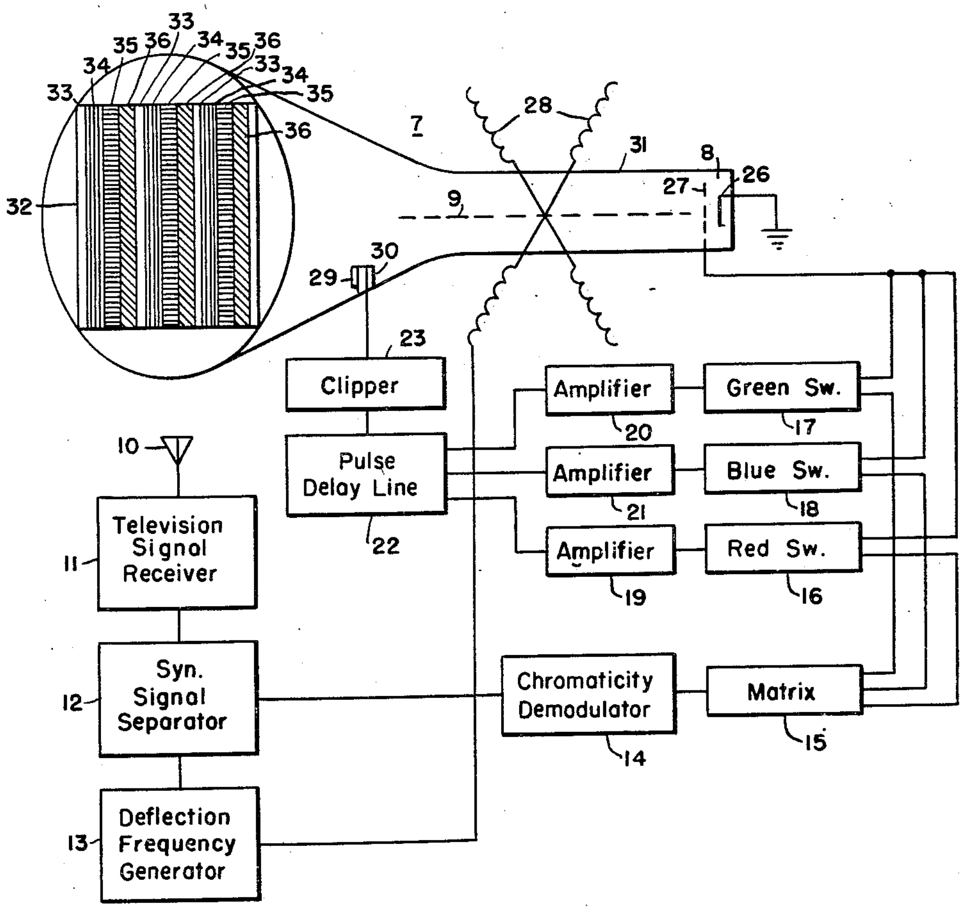
Fig. 1 is a block diagram showing an embodiment of my invention.

Refering in detail to Fig. 1, there is shown a cathode ray tube 7. The cathode ray tube 7 comprises an envelope 31 having a viewing screen 32 positioned at one end thereof. An electron source 8 of any suitable design having at least a cathode 26 and a control electrode 27 is provided at the opposite end of the envelope 31 from the viewing screen 32.

An electrostatic or electromagnetic deflection means such as deflection coils 28 are provided for scanning the electron beam 9 omitted frem the electron source 8 so as to scan a raster upon the viewing screen 32.

A light sensitive device 30, such as a photocell or photomultiplier is provided and is positioned so as to receive light emitted from the output screen 32. The light sensitive device 30 in this embodiment is positioned within the envelope 31. A light filter 29 is provided and positioned near to the light sensitive device 30 so as to permit passage of only light in the ultraviolet region to the light sensitive device 30. In this embodiment, a photomultiplier tube is utilized as the light sensitive device 30 so as to obtain an increase in the gain of the light signal received from the output screen 32.

The viewing screen 32 is a specially constructed screen of a large number of groups of strips 33, 34, 35 and 36 of phosphor or material capable of emitting light upon electron bombardment. The strips 33, 34, 35 and 36 are parallel and vertical in position so that the electron beam 9 will scan the strips transversely. In the drawing, only a few strips are shown, but this is only an indication of the organization of a much larger number of strips. The number of strips depending on the desired resolution.

The strips of phosphor 33, 34, 35 and 36 in this embodiment of my invention are arranged in groups. The first strip 33 of the group would be a phosphor capable of emission of its peak light in the ultraviolet region. It is also necessary that the material of strip 33, such as barium silicate activated by lead be of short decay time or persistence. In this embodiment, the phosphor in the strip 33 should decay to less than one-fifth of its initial light intensity value by the time the scanning beam 9 has passed over a group of four strips 33, 34, 35 and 36. In the present type of color television systems, this decay time would be of the order of 0.12 microseconds.

The remaining strips 34, 35 and 36 would be representative of the selected color components for the presentation of the image on the viewing screen 32. In this specific embodiment, the colors red, blue and green are represented, but it is obvious that any desired combination of colors or number of strips in a group may be used.

The second strip 34 of the group is comprised of a phosphor material such as zinc orthophosphate activated by manganese capable of emitting light of a red visible color. The third strip 35 of the group is comprised of a phosphor such as zinc silicate activated with manganese capable of emission of light of a green visible color. The fourth strip 36 of the group is comprised of a phosphor material such as zinc sulfide activated with silver capable of emitting light of a blue color.

It is desirable that the light from the second, third and fourth strips of phosphor decay to the order of one-tenth of its initial intensity value within the time required for the electron beam 9 to scan one frame. This time value in the present art is of the order of one-thirtieth of a second. This is of a relative long decay time compared to the decay time of the first strip 33. It is necessary that the strips 34, 35 and 36 decay in the above manner to obtain a desirable image.

The system which embodies the invention includes an antenna 10 which is in turn connected to a television signal receiver 11. The receiver 11 may be of conventional design so as to obtain a signal wave representing the component colors and a signal wave for synchronizing and controlling the deflection of the electron beam 9.

The deflection signal is separated from the video signals by the signal separator 12 and connected to a deflection frequency generator 13. The output of the deflection frequency generator 13 is utilized to energize the deflection coils 28 of the cathode ray tube 7.

The video signal is separated from deflection signal by the signal separator 12 and utilized to control the electron beam 9. The video signal is impressed on the electron source 8 to modulate the electron current. In this embodiment, the video signal is connected to the control grid 27 of the electron source 8.

The video signal derived from the signal separator 12 is connected to a chromaticity demodulator 14 such as described in chapter 9, "Television Engineering" by D. G. Fink. The output of the chromaticity demodulator 14 is connected to a matrix 15 such as described in Electronics, January 1953 issue, Compatible Color T. V. Receiver by K. F. Farr which performs an algebraic operation to give the individual selected color component signals which in this embodiment are red, green and blue. A switch or gating device 16, 17 and 18 is provided respectively in the red, green and blue video signal channels from the matrix 15. The output of the switches 16, 17 and 18 are connected to the control grid 27 of the electron source 8.

The switches 16, 17 and 18 are controlled by a signal obtained by the light sensitive device 30. A clipper circuit 23 of suitable design is connected to the light sensitive device 30. The clipper 23 may be used in some application to obtain a better signal. The output of the clipper circuit 23 is connected to a pulse delay line 22 of suitable design such as described in an article entitled "Video Delay Lines" by J. P. Blewett and J. H. Rubel in Proceeding of IRE, December 1947, page 1580. Three pulses of proper delay are obtained from the delay line 22 and applied respectively to the amplifiers 19, 20 and 21. The pulses fed through the amplifiers 19, 20 and 21 are connected respectively to the switches 16, 17 and 18 in order to control the switches so that only one of the video channels is connected to the electron source 8 at any one time. The amplifiers 19, 20 and 21 may be of any suitable design.

In operation, the electron source 8 will be biased so that when no video information is applied, there will be a small electron beam of current 9. This beam 9 must be of such a value that on striking the strip 33 of the output screen 32, sufficient ultraviolet light will be emitted from the strip 33 to energize the light sensitive device 30 so as to provide control pulses for the switches 16, 17 and 18.

The electron beam 9 scans a raster on the output screen 32 by means of the deflection signal provided to the deflection coils 28. The electron beam 9 will sweep transverse to the strips 33, 34, 35 and 36. When the electron beam 9 strikes a strip 33, ultraviolet light will be emitted which will energize the light sensitive device 30. The filter 29 allowing only ultraviolet light to fall on the light sensitive device 30.

The pulse of ultraviolet light received by the light sensitive device 30 is applied through the clipper 23 to the pulse delay line 22. Three delayed pulses are obtained from the pulse delay line 22 of different delay times. A first delayed pulse is obtained from the delay line 22 and coupled through the amplifier 19 to the switch 16. The delayed pulse operates the switch 16 so as to open the video channel and apply video information to the electron source 8. The delayed pulse applied to the switch 16 has been delayed by the delay line 22 so that the electron beam 9 has travelled from strip 33 to the approximate center of the strip 34. In this modification, the strip 34 emits light of a red color and the switch 16 is in the red video channel, therefore, as the beam 9 passes over strip 33, the switch 16 is gated so as to modulate the beam 9 with red video information from the received signal.

A second delayed pulse is obtained from the pulse delay line 22 as a result of initial pulse from the light sensitive device 30, and applied through the amplifier 20 to the switch 17 in the green video channel. This second delayed pulse has been delayed so as to operate the switch 17 when the electron beam 9 is approximately at the center of the strip 35. The strip 35 capable of emission of green light has its intensity modulated by the green video information applied to the electron gun 8 from the received signal.

A third delayed pulse is obtained from the pulse delay line as a result of the initial input pulse from the light sensitive device 30, and applied through the amplifier 21 to the switch 18 so as to gate or open the switch 18. This third delayed pulse has been delayed so as to operate the switch 18 applying blue video information from the received signal to the electron source 8 when the electron beam 9 is approximately in the center of the strip 36. The strip 36 is capable of emitting light of a blue color upon electron bombardment.

The electron beam 9 will then strike a strip 33 in the next group and the above described operation will repeat as the beam 9 scans across the output screen 32.

This embodiment provides a sensing signal from each group regardless of the strength of the video signal. By utilizing a phosphor of short decay time for the sensing element there will be no interference from the successive phosphor sensing strips 33 that are transversed by the electron beam 9 in scanning a raster. It is also apparent that ambient light and light from the strips 34, 35 and 36 will not interfere with the operation of the described embodiment due to the filter 29.

Figure 2:
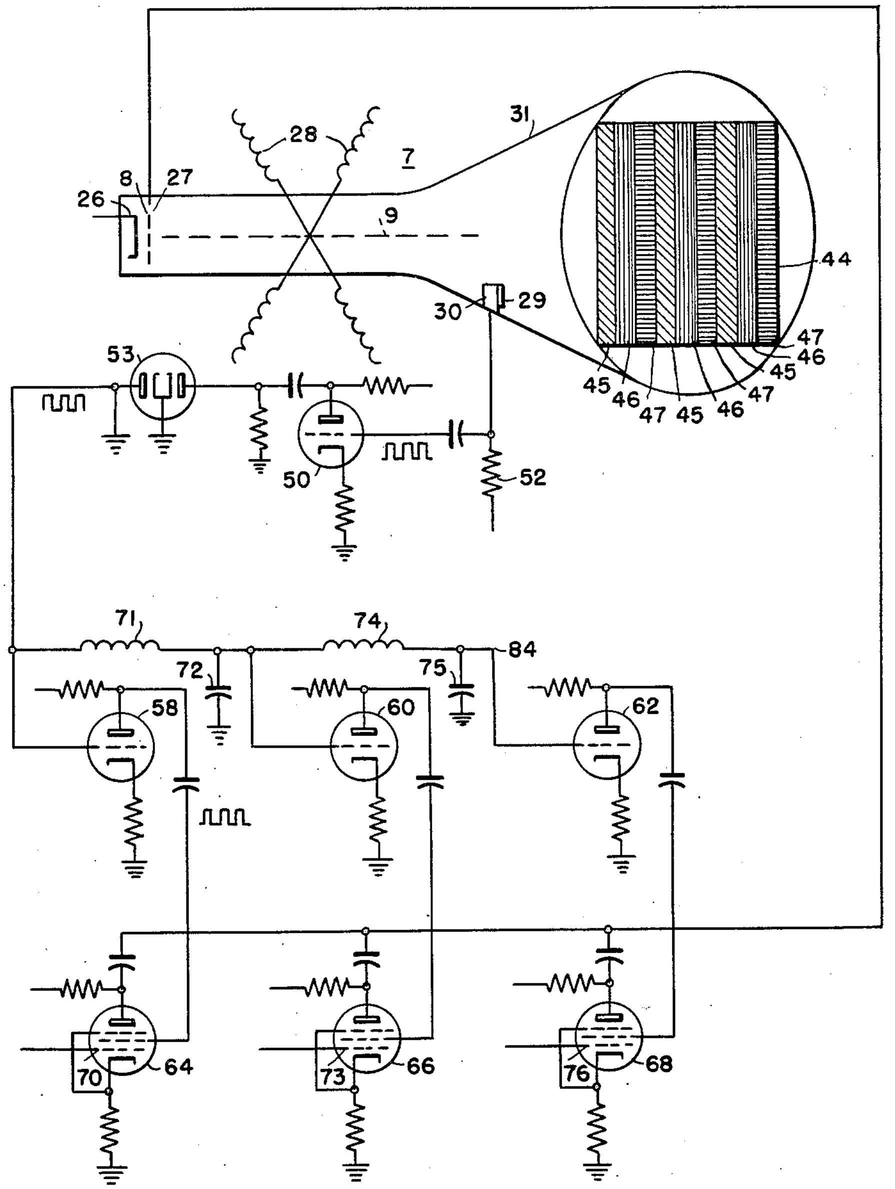
Fig. 2 is a schematic showing of another embodiment of my invention.

Referring now to Fig. 2, there is illustrated another form of my invention showing the circuits of a portion of the block diagrams shown in Fig. 1. An output screen 44 is provided at one end of the envelope 31 and an electron source 8 comprising a cathode 26 and the control grid 27 is provided at the opposite end of the envelope 31. A light sensitive device 30 such as a photo tube or photomultiplier and a filter 29 are provided within the tube 31 positioned near to the screen 44. The photocell 30 and the filter 29 may be positioned within the tube 31 or outside of the tube 31.

The light sensitive device 30 which in this embodiment is a photomultiplier develops a pulse of energy across a resistor 52 which is coupled through an amplifier tube 50 of suitable type and the output connected to a clipper tube 53. The output of the clipper tube 53 is connected to an amplifier tube 58. The output of the amplifier tube 58 is connected to a switching tube 64. The video information from one of the selected color components green is connected to the control electrode 70 of the switching tube 64 and the output of the switching tube 64 is connected to the control grid 27 of a tube 31. The output of the clipper tube 53 is also connected to a delay line 84, a first section of which comprises an inductance 71 and a capacitance 72. Fig. 2 illustrates only one section of the delay line which in practice will contain many sections. An amplifier 60 is connected across the first delay line 84. The output of the amplifier 60 is connected to a switching tube 66. The video information from a second selected color component red received from the receiver is applied to the control electrode 73 of the switching tube 66. The output of the switching tube 66 is connected to the control electrode 27 of the tube 31.

The output of the clipper tube 53 is connected through a delay line comprising inductances 71 and 74, capacitances 72 and 75 to an amplifier tube 62. The output of the amplifier tube 62 is connected to a switching tube 68. The blue video information from a third selected color component obtained from the reeciver is applied to the control electrode 76 of the switching tube 68. The output of the switching tube 68 is connected to the control electrode 27 of the electron gun 8.

The screen 44 of the tube 31 is a modified version of that shown in Fig. 1 in that each group is now composed of only three strips 45, 46 and 47, capable of emission of light upon electron bombardment. The first strip 45 comprises a phosphor that is capable of emitting light of a green color of a decay time of the order one-thirtieth of a second and also capable of emitting light within the ultraviolet region of the order of one-tenth of a microsecond. The phosphor in strip 45 may be a mixture of 50 percent by weight of triclinic calcium magnesium silicate activated by cerium which has a peak output at 3700

Angstroms and of very short persistance and 50 percent by weight of zinc silicate activated by manganese which emits light of a green visible color. The second strip 46 in the group is comprised of phosphor such as zinc phosphate activated by managnese capable of emitting light, a red color, of similar decay time to green color emitting phosphor in strip 45. The third strip 47 adjacent and parallel to the first two phosphor strips 45 and 46 is comprised of a phosphor such as zinc sulphide activated by silver of similar decay time to green color emitting phosphor in strip 45 capable of emitting light of a blue color. A plurality of the above-described groups of the same sequence are repeated across the face of the viewing screen 44.

The operation of the device shown in Fig. 2 is similar to that described in Fig. 1. The usual beam forming and deflecting arrangement 28 is utilized for the scanning of the electron beam 9.

As the scanning beam 9 transverses the vertically arranged phosphor strips 45, 46 and 47, ultraviolet light is emitted from the phosphor strip 45 and is received by the photocell 30. A first voltage is developed across the resistor 52 and is amplified by the amplifier tube 50 and applied to the clipper tube 53. The pulse from the clipper tube 53 is immediately amplified without delay by the amplifier tube 58 which activates the gating tube 64 permitting video information of the green color to be applied to the control electrode 27 of the tube 31. This video information controls the energy of the beam 9 which strikes the phosphor strip 45, permitting the reproduction of the green color on the viewing screen 44.

The pulse received from the clipper tube 53 is also coupled through the delay line, a section of which comprises the inductance 71 and capacitance 72 and amplified by the amplifier tube 60. The output of the amplifier tube 60 is connected to the switching tube 66 and activates the switching tube 66 permitting red video information to be applied to the control electrode 27 substantially when the electron beam 9 is positioned at the center of the phosphor strip 46.

The pulse from the clipper tube 53 after passing through a delay line, one section of which comprises the inductances 71 and 74 and capacitances 72 and 75 is connected to the amplifier tube 62. The output of the amplifier tube 62 activates the switching tube 68 permitting the blue video signal obtained from the received signal to be applied to the control electrode 27 of the electron source 8 at substantially the time that the electron beam 9 is positioned at the middle of the phosphor strip 47.

The electron beam 9 will then strike a second strip 45 and the sequence above will repeat as the beam 9 scans across the screen 44.

The modification shown in Fig. 2 has the advantage of utilizing only three strips of phosphor which represent the selected component colors and also permits one of the strips to function as the pulse-forming means. The modification shown in Fig. 2 also has all of the advantages of the device shown in Fig. 1.

While I have shown my invention in several forms, it will be obvious to those skilled in the art that it is not so limited, but is susceptible of various other changes and and modifications without departing from the spirit and scope thereof.

I claim as my invention:

1. A color television tube comprising an electron beam source, an image screen having a plurality of adjacent groups of vertical strip phosphors, each of said groups having a first strip of a phosphor mixture capable of emitting visible colored light and a light invisible to the human eye and of short decay time with respect to the other phosphors in said group, a second phosphor strip capable of emitting a second visible colored light, a third phosphor strip capable of emitting a third visible colored light, means for scanning said screen with said electron beam, a light sensitive device responsive to said invisible light from said first phosphor strip, and means for biasing said electron beam source at a low level to excite said first phosphor strip to emit invisible light to energize said light sensitive device without substantial emission of visible light.

2. A color television tube comprising an image screen having a first phosphor capable of emitting a red colored light and an ultraviolet light, a second phosphor strip capable of emitting a blue colored light, a third phosphor strip capable of emitting a green colored light and a fourth phosphor strip capable of emitting light of the same color as that of said first phosphor strip, means for scanning said strips transversely with an electron beam, a photomultiplier positioned near to said screen, said photomultiplier being sensitive only to the ultraviolet light from said first and fourth phosphor strips, means for deriving a pulse from said photomultiplier, circuit means for delaying said pulse, and gating means controlled by said delaying circuit means to control switches to pass signals representative of one color component at a time, sequentially and in synchronism with the scanning of the appropriately color designated strip-like elements.

3. In combination a cathode ray tube comprising an electron scanning source, and an image screen, said electron scanning source having an intensity control electrode, said image screen having a plurality of adjacent repeating groups of a first, second and third vertical phosphor strips, said phosphor strips being of similar size adjacent to and in the same relative position within each of said groups, said first phosphor strip being capable of emitting light representative of a first selected visible color and light in the ultraviolet region, said second phosphor strip capable of emitting light representative of a second selected color, said third phosphor strip capable of emitting light representative of a third selected color, a photomultiplier positioned near to said image screen, an ultraviolet filter positioned between said image screen and said photomultiplier so as to permit only ultraviolet light to fall on said photomultiplier, and means connecting said photomultiplier to said intensity control electrode to gate said electron scanning source to permit the proper color video information to modulate said electron scanning source when said electron source is positioned on the proper selected color phosphor strip.

References Cited in the file of this patent

UNITED STATES PATENTS

| | | |
|---|---|---|
| 2,545,325 | Weimer | Mar. 13, 1951 |
| 2,635,141 | Bedford | Apr. 14, 1953 |
| 2,644,855 | Bradley | July 7, 1953 |
| 2,689,269 | Bradley | Sept. 14, 1954 |